United States Patent [19]

Breslau

[11] Patent Number: 4,687,309
[45] Date of Patent: Aug. 18, 1987

[54] VIDEO CAMERA STABILIZER

[75] Inventor: Steven M. Breslau, Chicago, Ill.

[73] Assignee: Sima Products Corporation, Chicago, Ill.

[21] Appl. No.: 927,550

[22] Filed: Nov. 6, 1986

[51] Int. Cl.⁴ ............................................. G03B 17/00
[52] U.S. Cl. ........................................................ 354/82
[58] Field of Search ..................................... 354/80–82, 354/292–294

[56] References Cited

U.S. PATENT DOCUMENTS

| | | | |
|---|---|---|---|
| 817,207 | 4/1906 | Wheeler | 354/82 X |
| 1,993,485 | 3/1935 | Paul | 354/82 X |
| 2,636,822 | 4/1953 | Anderson | 354/82 X |
| 2,643,803 | 6/1953 | Bates | 354/82 X |
| 2,771,826 | 11/1956 | Shapiro | 354/293 X |
| 2,952,200 | 9/1960 | Welch | 354/293 X |
| 4,244,500 | 1/1981 | Fournier | 354/81 X |
| 4,327,986 | 5/1982 | Carter | 354/293 |
| 4,437,753 | 3/1984 | Dunn | 354/82 X |

Primary Examiner—Donald A. Griffin
Attorney, Agent, or Firm—Silverman, Cass, Singer & Winburn, Ltd.

[57] ABSTRACT

A device for transporting a camera and for reducing camera shake and arm fatigue by stabilizing the camera against the torso of a person. The device includes an arm that telescopes to a length suitable for the user to position the end of the arm upon which the camera is mounted adjacent his face. A bulbous, generally arcuate-shaped bumper is located at the end of the arm opposite that on which the camera is mounted and permits the use of the camera at various angles relative to the user's torso. Further, a neck strap is pivotally located adjacent the bumper such that when the neck strap is worn about the person's neck, and the camera is in use, the arm of the device is raised to place the camera at the person's eye level and the bumper rests against the person's torso but when the camera is not in use, the arm is lowered to allow the camera to be conveniently carried in front of or to one side of the user.

15 Claims, 10 Drawing Figures

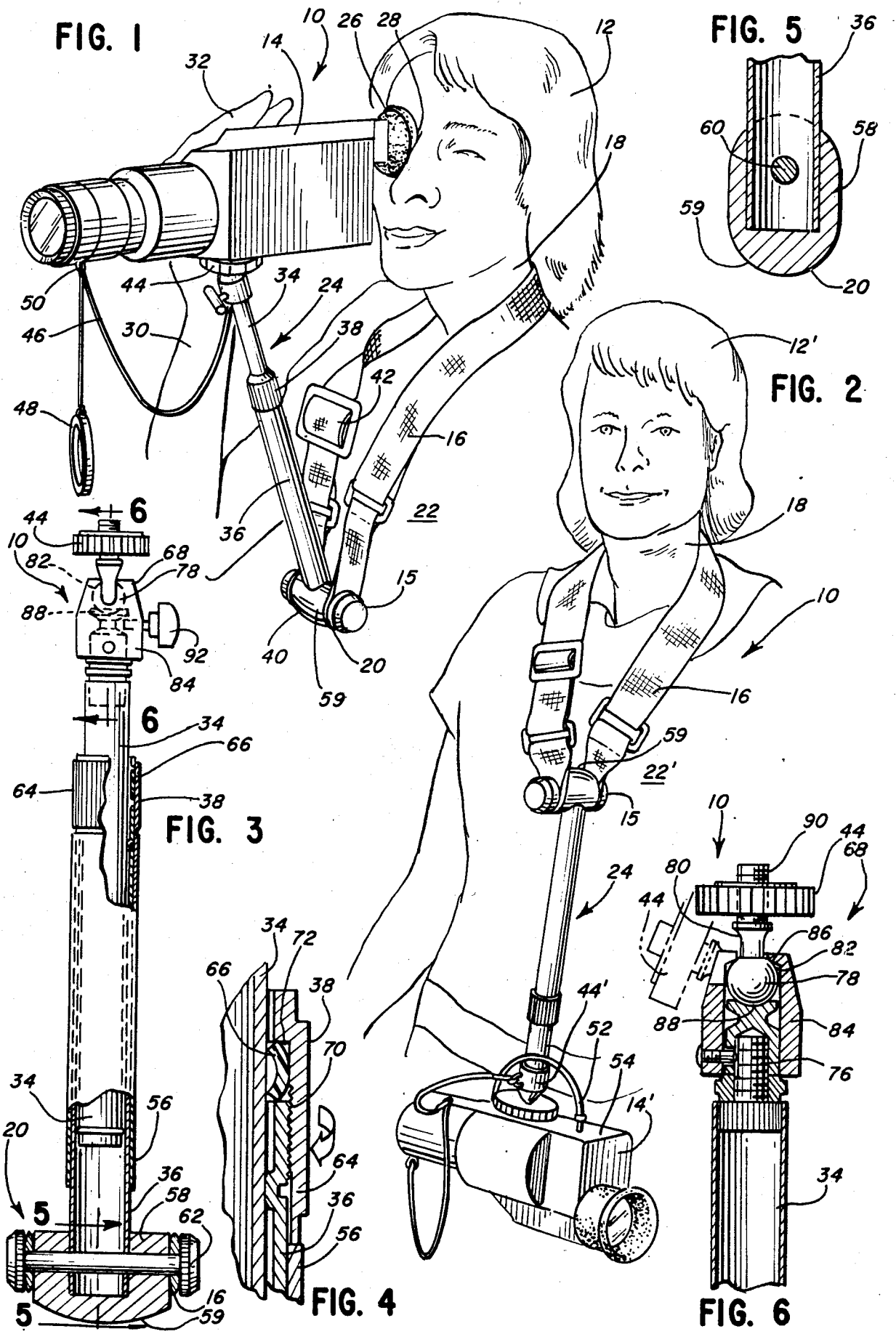

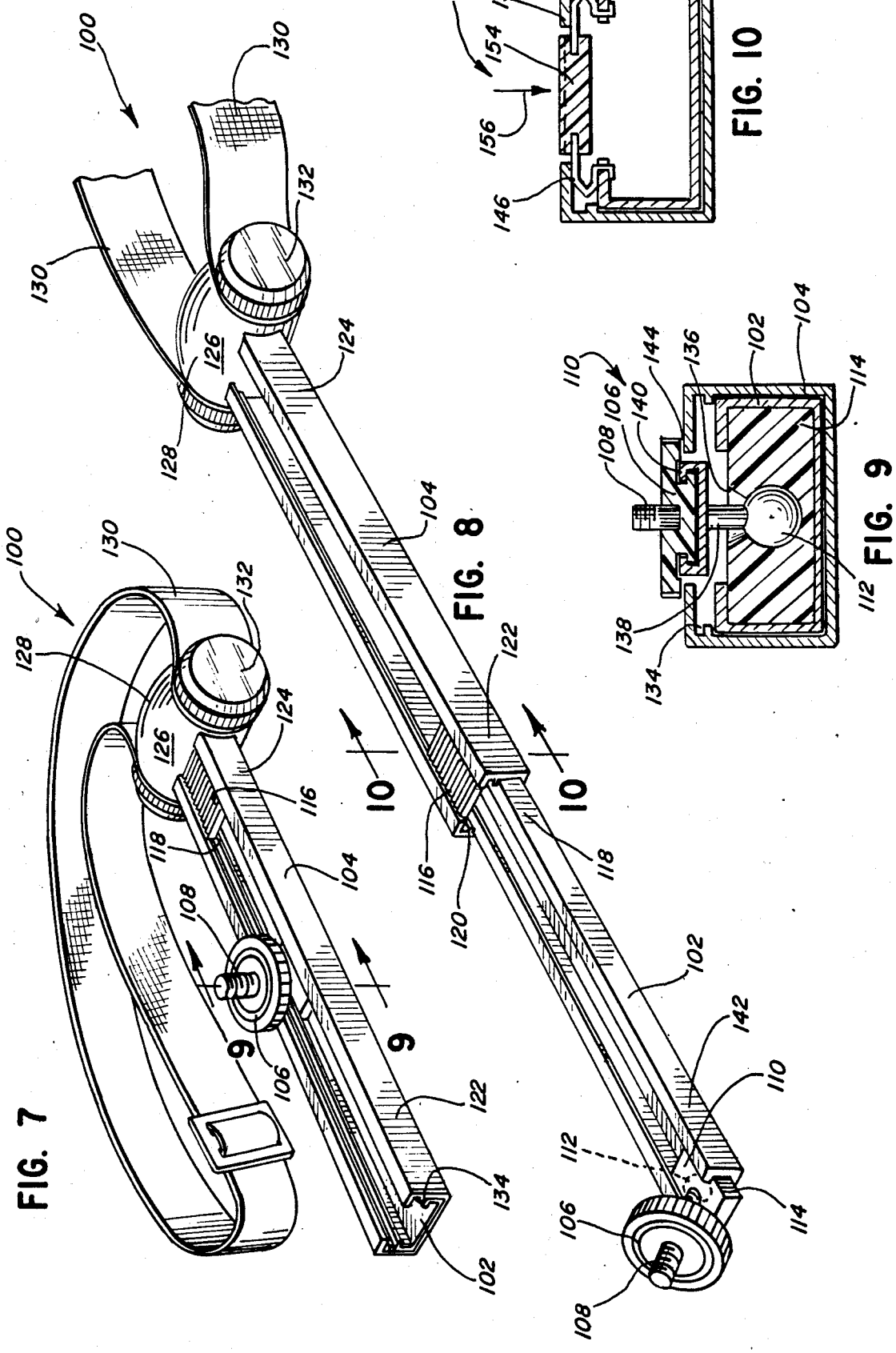

VIDEO CAMERA STABILIZER

BACKGROUND OF THE INVENTION

1. Field of the Invention

This invention relates generally to a support device for use with a hand-held camera, and more particularly, to a device for stabilizing the camera against the torso of a person when the camera is in use and for transporting the camera when the camera is not in use.

2. Description of the Prior Art

Clear, professional looking pictures and movies require that the camera be held extremely steady. Jerky movement or camera shake will result in an unacceptably blurred image. The problem of camera shake is particularly pronouced when the photographer is using a long exposure, such as that used in low light situations. However, camera shake is also a problem where the photographer is moving the camera while exposing continuous frames of film. These situations require smooth shake-free camera movement.

Video camera, 8 millimeter movie cameras and motor driven cameras that are capable of shooting pictures continuously at speeds of several frames per second are examples of cameras that are intended to pan or be moved while exposing film. Additionally, where the camera is equipped with a zoom feature, every camera motion is magnified when the photographer films while zooming. Camera shake must, therefore, be controlled in order for the photographer to produce clear, professional looking pictures or movies.

Another factor that might result in an unacceptably blurred image is arm fatigue. Arm fatigue occurs after the photographer has been filming for a period of time. Where the photographer must hold the camera with his arm in a relatively unnatural position for extended periods of time, arm fatigue might result thus generating a shaking movement that will cause a blurred image on the exposed film. Arm fatigue is a more prevalent problem when a long telephoto lens is used with the camera, adding weight thereto, or where a heavier camera, such as a video camera, is used. Thus, a reduction in arm fatigue will result in a reduction in camera shake.

There have been prior art attempts to overcome camera shake and arm fatigue. The most common solution has been to use a tripod which requires the user to carry an extra piece of camera equipment. The tripod is awkward to carry when not in a collapsed condition and when it is in such a condition, it must be assembled and attached to the camera before a picture can be taken. Spontaneous pictures, therefore, may be missed when the photographer is using a tripod. Another disadvantage is that the tripod must be set on a relatively level surface and such a surface may not always be available.

The use of a tripod for a movie camera or a video camera is particularly disadvantageous. Here, the photographer is restricted roughly to a horizontal pan taken from a single vantage point. Attempts to provide mobility have included placing wheels on the tripod itself or providing yet another piece of equipment, a tripod dolly. Of course, any roughness in the surface across which the tripod is moved will translate a vibration to the camera that is mounted on the tripod.

Another prior art solution has been to provide a platform that is inflexibly situated in front of the face of the photographer. The camera is then placed on the platform such that the photographer can site through the camera viewfinder and expose the film without the necessity of holding the camera. The most obvious disadvantage is that the camera obstructs the photographer's field of vision and impairs his ability to select the most advantageous angle from which to photograph. Additionally, the platform solution restricts camera movement that is necessary to produce professional looking moving pictures such as those produced by a movie camera or a video camera.

Still another prior art solution has been to attach an appendage to the camera such that when the appendage is hooked over the shoulder of the photographer, the camera can be positioned for filming. The appendage solution results in a bulky camera arrangement. The camera cannot be conveniently stored or carried with the appendage attached and when the appendage is not attached it becomes an extra piece of equipment that must be separately stored or carried.

The following U.S. patents are representative examples of various types of stabilizers with which the present invention is concerned:

| | |
|---|---|
| 2,586,954 | 4,083,480 |
| 2,636,822 | 4,244,500 |
| 2,771,826 | 4,327,986 |
| 2,952,200 | 4,437,753 |

As described above, the prior art attempts to eliminate camera shake and arm fatigue have several disadvantages including restricted camera movement while filming and inconvenient, bulky, additional pieces of equipment that must be carried and stored.

SUMMARY OF THE INVENTION

The disadvantages of prior art stabilizers are overcome in accordance with the present invention by providing a device for stabilizing a camera against camera shake and reducing arm fatigue without restricting camera movement. Further, the present invention may be used to comfortably and conveniently carry the camera when the photographer is not filming. The device includes an arm that telescopes to a length suitable for the user to position the end of the arm that has the camera positioned on a mount adjacent his face, while the other end of the arm rests against his torso. An arcuate-shaped resilient bumber is located on said other end of the arm such that, when the bumber is placed against the user's torso, use of the camera at various angles relative to the torso is permitted without sacrificing comfort or convenient camera balance. Further, a neck strap is provided pivotally located on the stabilizer adjacent the bumper such that when the neck strap is worn about the person's neck, and the camera is in use, the arm of the device is raised to place the camera at the user's eye level and the bumper rests against the user's torso. When the camera is not in use, the arm can be lowered to allow the camera to be conveniently carried in front of or to one side of the user.

A tether strap can be located between the camera and the camera mount to assure that, in the event the camera is separated from the camera mount, it will be safely retained within the radius of the tether strap. Additionally, a tether strap can be located between the camera lens cover and the camera mount such that, when not covering the lens, the lens cover is conveniently carried by the tether strap.

In one embodiment, the arm comprises two tubular telescoping sections. When used to stabilize the camera, the sections are telescoped to a selected length comfortable for the user and locked in place. The locking means can include a compressible clamping ring situated in a confined space between a threaded end of the inner tubular section and a threaded locking knob located on the outer tubular section adjacent the telescoping site. When the confined space is decreased by means of the locking knob, the compressible clamping ring will deform, thus frictionally restraining further telescopic movement of the sections.

The camera mount which is located on one end of the telescoping arm is provided with a ball and socket member that will allow movement of the camera on a variable plane. This freedom of movement is particularly advantageous when the photographer is using a movie camera or a video camera. The ball and socket member of the camera mount and the angular shaped resilient stabilizer compliment each other such that the photographer is able to achieve a smooth, natural, shake-free motion in his final picture.

In a second embodiment, the arm comprises two channel-shaped telescoping sections. Here, the locking means, a tension spring, is located between the sections such that the spring is always in compression, thus frictionally restraining telescopic movement of the sections. When the photographer wishes to adjust the length of the arm of the device, he releases the frictional restraint on the telescoping arms by pressing a conveniently located adjustment button, thereby further compressing the tension ring, repositions the arm sections to the desired length and then releases the adjustment button which locks the arms in the new position.

The ball and socket member of the camera mount of this embodiment is provided with a base that is slidably engaged within the channel-shaped arm. The telescoping arm can be collapsed and the camera mount, with the camera still attached, can be positioned along the channel such that the unit as a whole is compact. Thus, this embodiment of the invention has the additional advantage of being able to be closed to form a compact unit for storage or for transportation. The camera need not be detached from the device and, therefore, the device does not become an extra piece of camera equipment that must be carried or stored separately.

Various objects and advantages of the invention will become apparent in accordance with the above and foregoing disclosure in which preferred embodiments are described in detail in the specification and illustrated in the acompanying drawings. It is contemplated that minor variations may occur to the skilled artisan without departing from the scope or sacrificing any of the advantages of the invention.

BRIEF DESCRIPTION OF THE DRAWINGS

FIG. 1 is a perspective view showing one embodiment of the invention as used by a photographer to stabilize a camera used in association therewith;

FIG. 2 is a perspective view thereof showing the invention as used by the photographer to transport the camera;

FIG. 3 is an elevational view thereof with portions shown broken away, in section and in phantom outline;

FIG. 4 is a partial sectional view of the locking means illustrated in FIG. 3;

FIG. 5 is a sectional view taken along the line 5—5 of FIG. 3 in the direction indicated generally;

FIG. 6 is a sectional view taken along the line 6—6 of FIG. 3 in the direction indicated generally showing the ball and socket camera mount of the invention in a first position in solid outline and in a second position in phantom outline;

FIG. 7 is a perspective view of an alternate embodiment of the invention illustrating the same in collapsed condition;

FIG. 8 is a perspective view thereof illustrating the same in extended condition;

FIG. 9 is a sectional view taken along the line 9—9 of FIG. 7 in the direction indicated generally; and FIG. 10 is a sectional view taken along the line 10—10 of FIG. 8 in the direction indicated generally.

DESCRIPTION OF THE PREFERRED EMBODIMENTS

Referring to FIGS. 1 and 2, a first embodiment of the device of the present invention is designated generally by the reference numeral 10. FIG. 1 illustrates the device 10 as used by the photographer 12 to stabilize the camera 14. Neck strap 16 is attached to the device at one end 15 thereof and may be positioned about the photographer's neck 18. Bumper 20 of generally arcuate configuration is located against the torso 22 of photographer 12, and arm 24 of device 10 is in a raised position such that eye piece 26 of the camera 14 is within the field of vision of the eye 28 of photographer 12. Here, photographer 12 has arm 30 raised such that his hand 32 can comfortably grasp camera 14. In this position, photographer 12 can easily and comfortably direct camera 14 to a desired direction without having the full weight of camera 14 supported by his arm 30. Device 10 effectively carries the bulk of the weight of camera 14 thereby reducing arm fatigue as well as camera shake resulting from arm fatigue.

Arm 24, shown in FIG. 1, has two sections 34 and 36, with section 34 telescopically slidable within section 36. The telescoping sections 34 and 36 can be adjusted to a length that will assure a comfortable position for holding camera 14 when it is raised to the level of the eye 28 of photographer 12. When a comfortable length has been determined for arm 24, locking means 38 is then activated to prevent further telescopic movement of arm sections 34 and 36.

Bumper 20 is of generally bulbous, arcuate configuration and may be constructed of any suitable cushioned material such that arm 24 can be comfortably accommodated at various angles relative to torso 22 of photographer 12 without sacrificing the comfortable balance of camera 14 by photographer 12. Bumper 20 is secured at one end 15 of arm 24 which is intended to be positioned against the user's torso with neck strap 16 secured thereto.

Neck strap 16 is shown having adjustment means 42 such that it can be lengthened or shortened to a length that will most comfortably permit bumper 20 to rest against torso 22 of photographer 12. Each of the above described adjustments in the parameters of device 10 are designed to increase the comfort of photographer 12 and thereby reduce camera shake and arm fatigue.

Camera mount 44 is positioned at one end of arm 24 opposite end 15 upon which bumper 20 is positioned. Mount 44 has a ball and socket member (illustrated in FIG. 6) that will allow the mount to move on a variable plane relative to arm 24. The ability to freely move camera 14 positioned on mount 44 in any of a wide range of positions is enhanced by reason of the arcuate shape of bumper 20 which enables the photographer 12 to achieve smooth, natural moving pictures with a camera such as video camera 14, as illustrated in FIG. 1, without jerky motions or blurred images resulting from camera shake. Further, bumper 20 affords the user comfortable operation of the stabilizer resting against the user's torso.

Tether strap 46 is located between camera mount 44 and lens cover 48. When camera 14 is in use, lens cover 48 is conveniently carried by tether strap 46 and will remain in close proximity to lens housing 50. Thus, lens cover 48 need not be carried or stored as a separate piece of camera equipment.

FIG. 2 illustrates device 10 as used to transport camera 14'. Here, neck strap 16 is positioned around the neck 18 of photographer 12'. Arm 24 is in a lowered position. In this position, photographer 12' need not hold camera 14' and can easily and conveniently carry camera 14' either in front of or to one side of torso 22'. Camera 14' is further shown having tether strap 52 secured at one end to camera housing 54 and at the other end to camera mount 44'. Should camera 14' come loose from camera mount 44', tether strap 52 would safely restrain camera 14' within the radius of tether strap 52.

FIG. 3 illustrates the device 10 with locking means 38 in the unclamped position. First arm section 34 is telescopically engaged within second arm section 36. The telescoping sections 34 and 36 may be formed of aluminum with an exterior rubber sleeve 56 provided to protect both the device and any additional camera equipment carried by the user from damage caused by contact with device 10. The device 10 may, however, be formed from any of a wide variety of materials which are not intended to limit the scope of the invention.

Bumper 20 comprises a resilient body 58 with a generally arcuate-shaped surface 59. Pivot pin 60 passes through passageway 61 within resilient body 58 such that neck strap 16, attached to opposite ends of pin 60 by retainer 62, freely pivots on pivot pin 60. Pivot pin 60 passes through second arm section 36 to secure bumper 20 and neck strap 16 to end 15 of arm 24 (see FIG. 5).

When it is desired to lock telescoping arm sections 34 and 36 in a fixed position, locking sleeve 64 is adjusted such that deformable ring 66 is compressed thereby frictionally locking sections 34 and 36 in place. Deformable ring 66 is shown in the uncompressed state in FIG. 3 and in the compressed state in FIG. 4.

A matingly engageable set of threads 70 is located on first arm 34 and on locking sleeve 64. Deformable ring 66 is slidably located on first arm 34 and contained within housing 72 which is formed by first arm 34 and locking sleeve 64. As locking sleeve 64 is rotated to tighten the same on first arm 34, deformable ring 66 is compressed so as to frictionally clamp first arm 34 in place and prevent telescoping of first arm section 34 within second arm section 36.

Ball and socket member 68, best seen in FIG. 6, is secured to first arm section 34 by means of threaded extension 76. Camera mount 44 is attached to a ball 78 by means of ball attachment 80. Socket 82 is formed by housing 84 such that ball 78 is retained in housing 84 by means of housing shoulder 86. Ball 78 rests against deformable ball seat 88 such that ball 78 can be rotated within socket housing 84. The angular orientation of camera mount 44 in relation to first arm section 34 can, therefore, be adjusted through both a horizontal and a vertical plane by rotating ball 78 within housing 84.

Camera attachment 90 is shown as a threaded member mounted on camera mount 44 such that camera 14 can be tightly screwed to mount 44. When camera 14 is secured to camera mount 44, ball and socket member 68 will afford freedom of movement on a variable plane thus enabling photographer 12 to readily obtain the most advantageous angle from which to photograph. This freedom of movement will further afford a smooth, shake-free pan when filming with a moving camera such as a video camera.

Should the photographer 12 wish to lock ball and socket member 68 in a rigid position, this can be accomplished by means of locking knob 92 shown in FIG. 3. Locking knob 92 is in threaded engagement with socket housing 84. When locking knob 92 is screwed into socket housing 84, it tightens against deformable ball seat 88, thus compressing ball seat 88 and frictionally locking the position of ball 78 within socket 82. Further adjustment of camera mount 44 is easily accomplished by unscrewing locking knob 92 and repositioning camera mount 44 to the desired angle. Thereafter, photographer 12 can relock ball and socket member 68 in the new position or leave ball and socket member 68 in a freely rotating state.

A second embodiment of the invention is illustrated in a closed position in FIG. 7 and in an extended position in FIG. 8. The device is designated generally by numeral 100. First arm section 102 and second arm section 104 are of generally channel-shape configuration with first arm section 102 telescopically engaged within second arm section 104. Camera mount 106, having threaded camera attachement means 108, is slidably engaged within channel-shaped first arm section 102 such that camera mount 106 can be positioned along the length of first arm section 102. Ball and socket member 110, shown having a ball 112 and a socket housing 114, is illustrated in greater detail in FIG. 9.

Locking means 116 is attached at one end 118 of first arm 102 such that when device 100 is in the extended position, as seen in FIG. 8, locking means 116 is aligned at the juncture 120 of first arm 102 and one end 122 of second arm 104, first arm 102 and end 122 of second arm 104 being partially overlapped. When device 100 is in the closed position, as seen in FIG. 7, locking means 116 remains fixedly attached to one end 118 of first arm 102. Because of the telescopic function of first arm section 102 and second arm section 104, locking means 116 is now positioned at the other end 124 of second arm section 104. Locking means 116 can be used to lock arm sections 102 and 104 in any position intermediate to the above described extremes.

Bumper 126, having a bulbous, generally arcuate-shaped body 28, is shown attached to end 124 of second arm section 104. Neck strap 130 is pivotally mounted at respective ends of bumper 126 and held in place by neck strap retainer 132. The construction and function of bumper 126 and its associated elements is substantially the same as that of bumper 20 previously described.

The ball and socket member 110 is shown in greater detail in the cross-sectional view of FIG. 9. First arm section 102 is slidably engaged in second arm section 104. Further guide means 134 function to guide first arm section 102 as it telescopes within second arm section 104. Socket housing 114 is slidably engaged in first arm section 102 and can be positioned at any desired location along the length of first arm section 102.

Camera mount 106, having threaded camera attachment means 108, is fixed to ball attachment 136 by bracket 138. Ball 112 is positioned in socket 140 and socket 140 is located within slidable socket housing 114. As best seen in FIG. 8, when socket housing 114 is slid to the end 142 of first arm section 102 and is positioned at an end opposite to the end 118 of first arm section 102, where locking means 116 is located, ball 112 can be rotated within socket 140. However, when socket housing 114 is positioned along the length of first arm section 102, camera mount 106 is prevented from moving out of plane by lip 144 of second arm section 104. This restraint is particularly advantageous when the device 100 is closed for storage as shown in FIG. 7. Here, camera 14 (shown in FIGS. 7 and 8) can be left attached to device 100 without fear that it will flop around and become damaged.

Locking means 116 is illustrated in detail in FIG. 10. Tension spring 146 is fixed to lip 148. Lip 148 is located on first arm section 102. Tension spring 146 is confined in housing 150 formed between lip 148 of first arm section 102 and lip 152 of second arm section 104. When tension spring 146 is in compression within housing 150 it will frictionally lock first arm 102 and second arm 104 in place. When it is desired to adjust the position of first arm 102 relative to second arm 104, button 154 is depressed in the direction shown by arrow 156, thus further compressing tension spring 146 and thereby releasing the frictional lock within housing 150.

Minor variations in the structure and other variations in the arrangement and size of the various parts may occur to those skilled in the art without departing from the spirit or circumventing the scope of the invention as set forth in the appended claims.

I claim:

1. A device for transporting a camera and for stabilizing said camera against the torso of a person which comprises:
    an arm having at least two sections aligned such that one section is telescopically enjoyable within the other section;
    means for locking said sections in place such that one section is prevented from sliding within the other section;
    a mount located on one end of said arm, said mount including a ball and socket member interposed between said mount and said arm such that said mount is movable on a variable plane;
    a generally arcuate-shaped bumper positioned on the end of the arm opposite said one end, said bumper including a resilient surface such that said bumper may comfortably rest against said torso of said person, said bumper further accommodating said arm at various angles relative to said torso of said person; and
    a neck strap pivotally positioned adjacent said bumper wherein said neck strap is worn about the neck of said person such that when said device is to stabilize said camera said bumper rests against the torso of said person with said arm raised to place said camera at eye level, and when said device is to transport said camera said arm is lowered to allow said camera to be carried in front of or to one side of said person.

2. A device for transporting a camera and for stabilizing said camera against the torso of a person which comprises:
    an arm;
    a mount located on one end of said arm, said mount including means for attaching said camera to said mount;
    a bulbous bumper of generally arcuate-shaped configuration located on the end of said arm opposite to said one end; and
    a neck strap secured to said device adjacent to the bumper wherein said neck strap may be positioned about the neck of said person with said bumper positioned against the torso of said person and said arm raised to stabilize a camera attached to said mount at the person's eye level.

3. The device as defined in claim 2 wherein said arm includes at least two sections, one section being telescopically enjoyable within the other section.

4. The device as defined in claim 3 further including means for locking said sections relative to each other.

5. The device as defined in claim 4 wherein said locking means include a deformable ring which when compressed will frictionally lock said sections together.

6. The device as defined in claim 4 wherein said locking means include a tension spring located between said sections such that when said spring is in compression said sections are frictionally locked together.

7. The device as defined in claim 4 wherein said sections are of generally tubular configuration.

8. The device as defined in claim 4 wherein said sections are of generally channel-shaped configuration.

9. The device as defined in claim 8 wherein said mount includes a base, said base being slidably engaged in said channel-shaped arm such that said mount can be moved to varying locations along said arm.

10. The device as defined in claim 2 wherein said mount includes a ball and socket member interposed between said mount and said arm such that said mount is movable on a variable plane.

11. The device as defined in claim 2 in which said bumper is formed of resilient cushioning material.

12. The device as defined in claim 2 further including a tether strap, one end of said tether strap being attached to said camera and the other end of said tether strap being attached to said mount such that said camera is retained within the radius of said tether strap.

13. The device as defined in claim 2 further including a tether strap, one end of said tether strap being attached to a camera lens cover and the other end of said tether strap being attached to said mount such that said camera lens is retained within the radius of said tether strap.

14. The device as defined in claim 2 in which said bumper includes a resilient exterior surface such that said surface provides a cushion against said torso of said person.

15. A device for transporting a camera and for stabilizing said camera against the torso of a person comprising, an arm having a camera mount located on one end of said arm and a bumper of generally arcuate-shaped configuration located on the end of said arm opposite said one end, a neck strap pivotally located adjacent said bumper wherein said neck strap is worn about the neck of said person such that when said device is to stabilize said camera said bumper rests against the torso of said person with said arm raised to place said camera at eye level, and when said device is to transport said camera said arm is lowered to allow said camera to be carried in front of or to one side of said person.

* * * * *

UNITED STATES PATENT AND TRADEMARK OFFICE
CERTIFICATE OF CORRECTION

PATENT NO. : 4,687,309

DATED : August 18, 1987

INVENTOR(S) : Steven M. Breslau

It is certified that error appears in the above-identified patent and that said Letters Patent is hereby corrected as shown below:

Column 2, lines 46 and 47, change "bumber" to --bumper--;

Column 3, line 18, change "compliment" to --complement--;

Column 5, line 49, change "engageable" to --engagable--;

Column 7, line 39 and column 8, line 15, change "enjoyable" to --engagable--.

Signed and Sealed this

Twenty-sixth Day of January, 1988

Attest:

DONALD J. QUIGG

*Attesting Officer*      *Commissioner of Patents and Trademarks*